G. C. GALE.
AUTOMATIC SAFETY TRAIN LINE ATTACHMENT.
APPLICATION FILED SEPT. 6, 1910.
991,968.
Patented May 9, 1911.
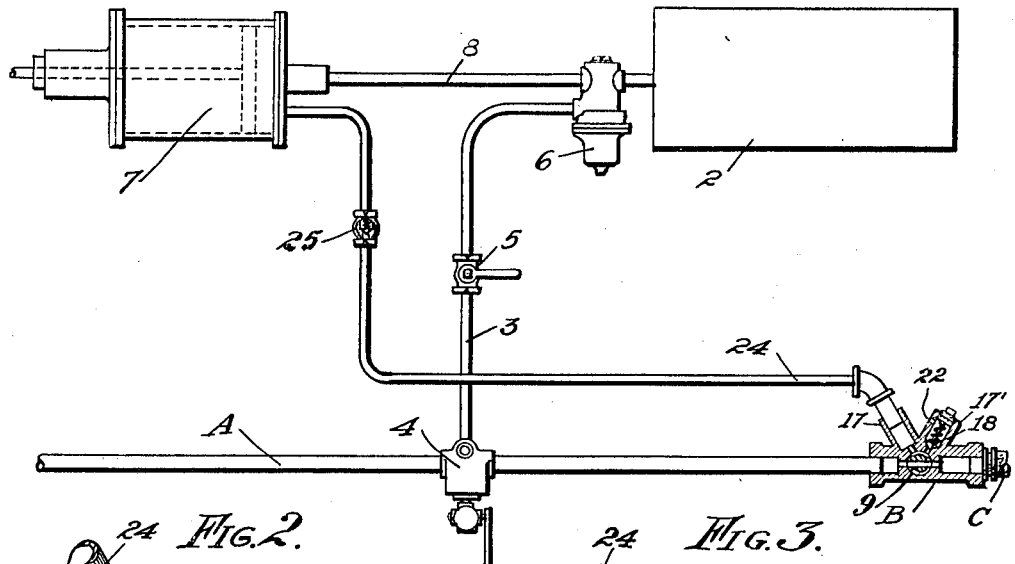
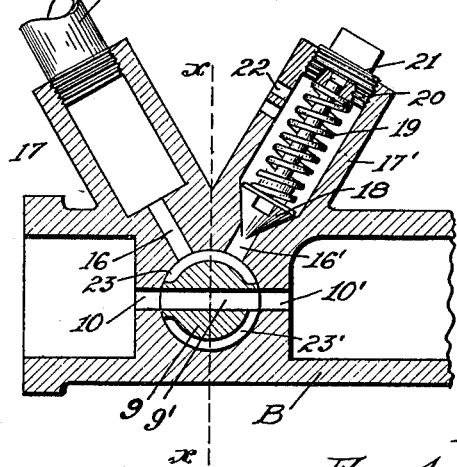
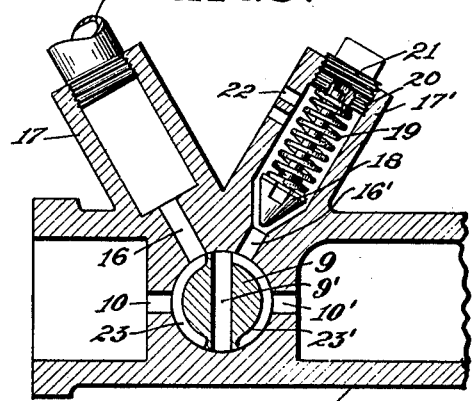
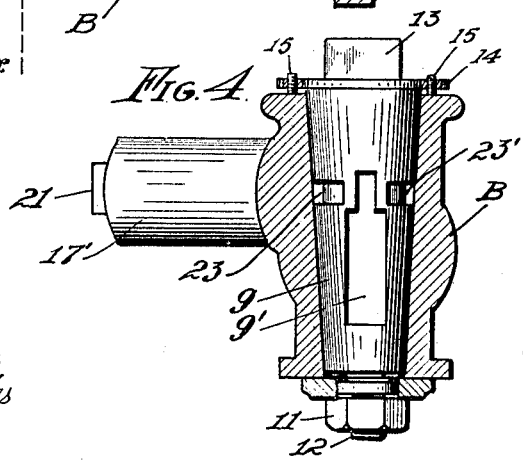
WITNESSES;
INVENTOR
GEORGE C. GALE
BY
HIS ATTORNEY.

UNITED STATES PATENT OFFICE.

GEORGE C. GALE, OF ALAMEDA, CALIFORNIA.

AUTOMATIC SAFETY TRAIN-LINE ATTACHMENT.

991,968. Specification of Letters Patent. Patented May 9, 1911.

Application filed September 6, 1910. Serial No. 580,639.

*To all whom it may concern:*

Be it known that I, GEORGE C. GALE, citizen of the United States, residing at Alameda, in the county of Alameda and State of California, have invented new and useful Improvements in Automatic Safety Train-Line Attachments, of which the following is a specification.

This invention relates to an attachment for air brakes and particularly pertains to a means for operating the air brakes on a locomotive or car from an air-line cut-out cock.

The object of this invention is to provide a direct communication from the train-line cut-out cock to the brake cylinder for the purpose of setting the brakes with the exhaust from the cut-out cock.

Another object is to provide a means for setting the brakes of a locomotive or car with the straight air of the train-line through an angle or cut-out cock when the latter is closed to the train-line and which will retain the brakes in a set position until the cut-out cock is again opened to the train-line.

A further object is to provide an angle or cut-out cock which is adapted to be connected with the brake cylinder, and which is especially designed to set the brakes of a locomotive and the train attached thereto, whenever the cut-out cock is cut out or closed to the train-line.

The invention consists of the parts and the construction and combination of parts as hereinafter more fully described and claimed, having reference to the accompanying drawings, in which—

Figure 1 is a diagram illustrating the invention as applied. Fig. 2 is a longitudinal section of the cut-out cock as open to the train-line. Fig. 3 is a similar view showing the cut-out cock as closed to the train-line and open to the brake cylinder. Fig. 4 is a vertical section on the line X X Fig. 2, showing the valve plug in elevation.

In the drawing A represents the air-line or brake-pipe of a locomotive or locomotive tender which is connected at its rear end with a specially designed cut-out cock B leading to the hose coupling C, and at the other end with the air pumps on the locomotive, not shown. The line pipe A is connected to an auxiliary reservoir 2 through a pipe 3, a drain cup 4, cut-out cock 5 and a triple valve 6, interposed between the brake pipe A and the reservoir 2 in the ordinary manner. A brake cylinder is represented at 7 in which the usual piston for operating the brake rods is mounted. The brake cylinder 7 is connected to the triple valve 6 by means of a pipe 8 through which air is delivered from the auxiliary reservoir 2 in the usual manner. The operation of the triple valve 6 through the reduction of air in the train-line or brake pipe A and the setting of the brakes from the brake cylinder 7, is the same as generally employed in air brake equipment and is too well known and understood to need describing here.

The present invention resides in the use of the specially constructed cut-out cock B and the connection to the brake cylinder 7 therefrom.

The cut-out or angle cock, of which B indicates the casing, is constructed as follows: A conical plug 9 slotted at 9' seats in the casing B in the usual manner, with the slot 9' adapted to register with corresponding ports 10—10' in lateral partitions formed in the casing B, as shown in Figs. 2–3. The plug 9 may be retained in the casing B in any suitable manner, a nut 11 screwed on a threaded stud 12 on the lower end of the plug 9 being here shown for that purpose. The upper end of the plug is provided with a wrench-projection 13 and is flanged at 14 to receive set-screws 15 by the adjustment of which the plug 9 may be prevented from becoming bound or wedged in its seat in the casing B.

The casing B is perforated at 16—16', forming a pair of ports on one side of the plug 9 at equal distances from the longitudinal center line and in a plane transverse to the axis of the plug. Each of the ports 16—16' is covered with a casing 17—17' in one of which is seated a valve 18 normally closing the port 16', and on the top of the valve is placed a spring 19 which is regulated by an adjustable screw 20 so that the valve can be adjusted to resist any pressure that is desired and will be adjusted so that the pressure will be a few pounds, say ten pounds, less than the amount of air used in each particular train-line. On top of the screw is placed a plug 21 to prevent the valve from being tampered with and also to lock the valve in the position in which it may be placed when adjusted. The casing 17' is pierced with vent ports 22, which allow the air to pass from the inside of the casing B to the atmosphere when the valve 18 is opened.

The plug 9 is circumferentially grooved at 23—23' on opposite sides of port 9' and in the plane of the ports 16—16'; the groove 23 terminating at each end not less than three thirty-seconds of an inch nor more than one-quarter inch from the aperture or port 9', while the groove 23' opens at one end to the slot 9' and vanishes at the other end on the surface of the plug not less than one-quarter inch from the edge of the port 9'. With this arrangement the least turn of the plug 9 from open toward closed position permits the air from the inside of the train-line A to enter the groove 23, thence it will go through the port 16' pierced on the corresponding side and come in contact with the valve 18 placed inside of the casing 17', and lift it from its seat. An amount of air corresponding to the difference between the train-line pressure and the resistance of the spring will then pass into the inside of the casing 17', and thence out through the ports 22 drilled in the side thereof to the atmosphere. This difference will always be regulated by the spring and can be made any amount desired, but would, of course, be only such an amount as would be sufficient to set the brakes and would not permit the waste of any air in the air-line over and above what was sufficient to set the brakes. The air entering the groove 23 through the slot 10 from the brake pipe A will also pass through the port 16 into the casing 17 and from thence will pass through a pipe 24, leading from the angle cock B to the brake cylinder 7, whereupon it will act directly upon the piston in the brake cylinder, which has previously been operated from the auxiliary reservoir 2 in the usual manner by the reduction of air pressure in the brake-pipe A through the turning of the plug 9 in the angle cock B. A check valve 25 is interposed on the pipe 24 between the angle cock B and the brake cylinder 7 for the purpose of preventing the pressure from the brake cylinder working back to the train-line or brake-pipe A.

From the foregoing, it will be seen that by turning the plug 9 into the position shown in Fig. 3, that the full pressure of air in the pipe A, which is supplied direct from the engine pump, will be allowed to enter the brake cylinder 7 and thereby hold the brakes forward of the angle cock B, in a set position with the entire pressure of the air in the brake-pipe A. It will also be seen that the brakes will remain set as long as the angle valve B remains closed to the train-line, and that in order to release the brakes the plug 9 must be turned back into the position shown in Fig. 1, whereupon the air in the cylinder 7 being exhausted through the triple valve 6 in the usual manner, the brakes will be released.

The principal advantage derived through the use of this attachment, is, that should the angle cock B inadvertently or otherwise become closed to the train-line A, while the locomotive is standing still, so that some of the cars are cut off from the air on the engine, the brakes ahead would be set and prevent the moving of the engine or train until that particular cock would be opened to the train-line A. Likewise, were an angle cock B closed to the train-line while the locomotive was in motion, the brakes would be set so as to bring it to a stop. The setting of the brakes on a locomotive or car equipped with this device without the operation of the engineer's valve would immediately indicate that a cut-off cock B has been closed and that the train-line is not in full communication throughout the train.

Having thus described my invention, what I claim and desire to secure by Letters Patent is—

1. The combination with the air-line, and the brake cylinder, of a cut-out cock in the air-line having a by-pass connection with the brake cylinder for the purpose of operating the brake cylinder piston and setting the brakes when the cut-out cock is turned to cut off the air-line.

2. The combination with the air-line, and a brake-cylinder, of means connected with the air-line for operating the brake cylinder piston, and a cut-out cock in the air-line having a port to register with the air-line, and having a by-pass with connection to the brake cylinder whereby if the cut-out cock is turned to cut off the air-line, the by-pass is brought into register with the air-line, and train line pressure is transmitted to the brake cylinder to set the brakes.

3. The combination with the air-line, of a brake cylinder, fluid connections between the air-line and brake cylinder for operating the brake cylinder piston, a cut-out cock having two vents one of which is open to the atmosphere, and the other of which is connected to the brake cylinder, and means whereby on the turning of the cock air may be admitted from the train-line through the cock and last named of said vents to the brake cylinder.

4. The combination with the train-line, of a brake cylinder, auxiliary reservoir and triple valve brake operating connections between the train-line and reservoir and brake cylinder and triple valve, and a cut-out cock in the train-line having a by-pass connection with the brake cylinder, whereby if the cut-out cock is turned to cut off the train-line the brake cylinder piston will be operated to set the brakes.

5. The combination with the air-line, of a brake cylinder, fluid connections between the air-line and brake cylinder for operating the piston in the brake cylinder, a cut-out cock in the air-line, said cut-out cock consisting of a casing, a turnable plug in the casing having a port registerable with the air-line, said plug having two circumferential grooves on opposite sides of the port in the plug, the casing having lateral ports in the plane of said groove and arranged to open into said grooves, and one of said ports in the casing connecting with the brake cylinder.

6. The combination with the air-line, of a brake cylinder, fluid connections between the air-line and brake cylinder for operating the piston in the brake cylinder, a cut-out cock in the air-line, said cut-out cock consisting of a casing, a turnable plug in the casing having a port registerable with the air-line, said plug having two circumferential grooves on opposite sides of the port in the plug, the casing having lateral ports in the plane of said groove and arranged to open into said grooves, one of said ports in the casing connecting with the brake cylinder, a check valve in the other of said ports which is open to the atmosphere, and a check valve in the connections between said cock and the brake cylinder.

In testimony whereof I have hereunto set my hand in the presence of two subscribing witnesses.

GEORGE C. GALE.

Witnesses:
T. P. MEPHAN,
JENNIE W. BACON.

---

Copies of this patent may be obtained for five cents each, by addressing the " Commissioner of Patents, Washington, D. C."